United States Patent [19]

Mangone, Jr.

[11] Patent Number: 5,064,231

[45] Date of Patent: Nov. 12, 1991

[54] APPARATUS AND METHOD FOR MOLDING THREE DIMENSIONAL ARTICLES

[76] Inventor: Peter G. Mangone, Jr., 28600 Buchanan Dr., Evergreen, Colo. 80439

[21] Appl. No.: 542,195

[22] Filed: Jun. 21, 1990

Related U.S. Application Data

[63] Continuation-in-part of Ser. No. 348,515, May 8, 1989, Pat. No. 4,956,142.

[51] Int. Cl.⁵ .................. B65D 33/34; B65D 63/00
[52] U.S. Cl. ........................... 292/319; 292/320; 292/328; 24/16 PB
[58] Field of Search ............ 292/307 B, 318–321, 292/329, 328, 331; 24/16 PB

[56] References Cited

U.S. PATENT DOCUMENTS

| | | | |
|---|---|---|---|
| 1,943,988 | 1/1934 | Peake | 292/318 |
| 1,964,013 | 6/1934 | Wenk | 292/320 |
| 1,964,015 | 6/1934 | Wenk | 292/320 |
| 3,367,701 | 2/1968 | Wenk, Jr. | 292/321 |
| 3,718,355 | 2/1973 | Canter | 292/321 |
| 3,730,578 | 5/1973 | Gerlach | 292/318 |
| 4,106,802 | 8/1978 | Lozio | 292/320 |
| 4,420,857 | 12/1983 | Clay | 24/16 PB |
| 4,559,676 | 12/1985 | Paradis | 292/318 |
| 4,676,535 | 6/1987 | Mautner | 292/321 |
| 4,854,014 | 8/1989 | Ueno | 292/319 |
| 4,878,702 | 11/1989 | Madsen et al. | 292/307 R |

Primary Examiner—Eric K. Nicholson
Assistant Examiner—Darnell Boucher
Attorney, Agent, or Firm—Klaas & Law

[57] ABSTRACT

A uni-directional lock having a body portion having two passageways extending therethrough and each having an internal indentation, an entrance portion and an exit portion and a link portion having an enlarged head portion and two integral leg portions each having a flexible portion having a hook projecting outwardly therefrom wherein the hook and the exit portion are dimensioned to prevent entry of the hook through the exit portion into the body portion or the flexible portion comprises two separate sections or the flexible portion is provided with structure so that it is frangible to form two separate sections.

8 Claims, 3 Drawing Sheets

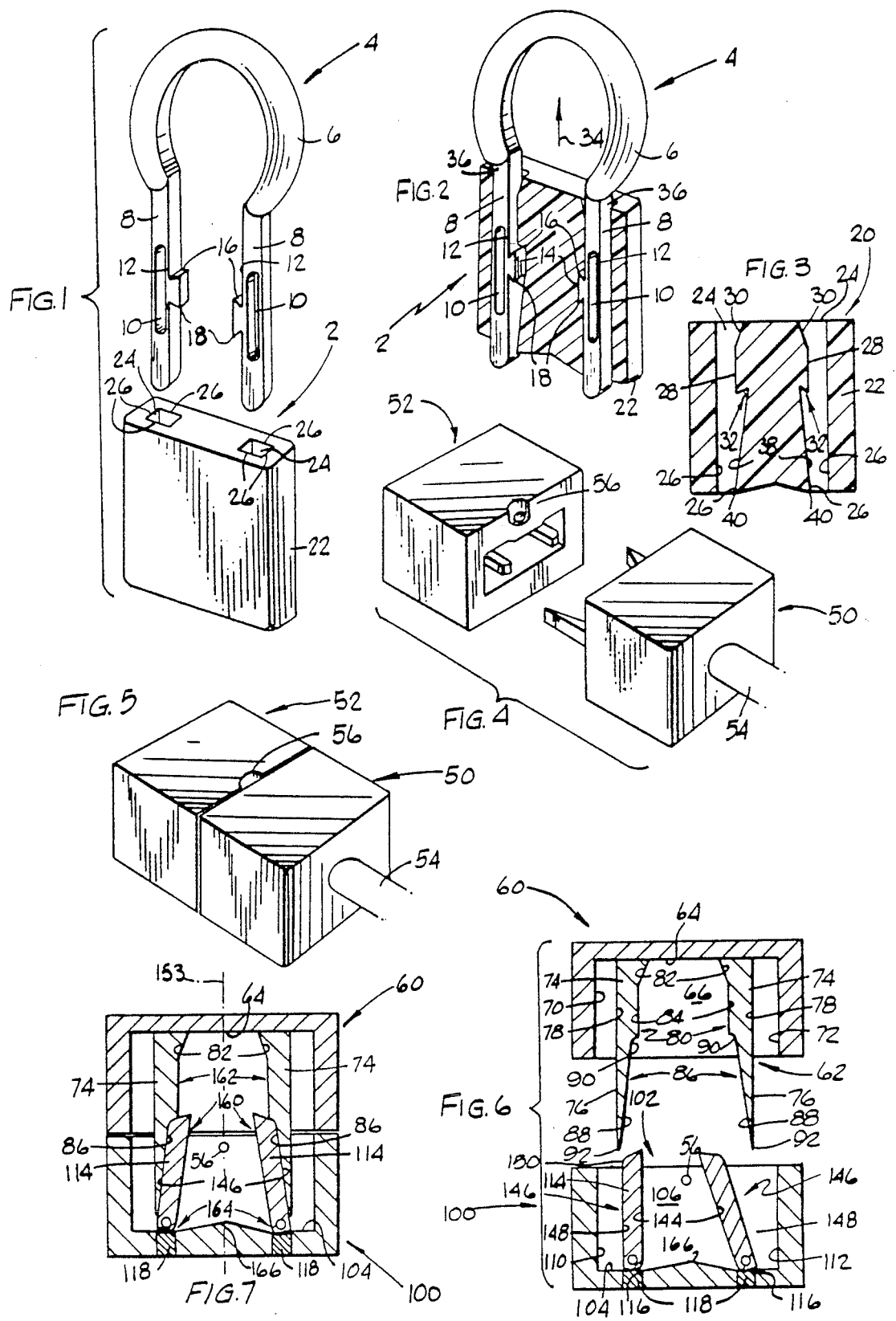

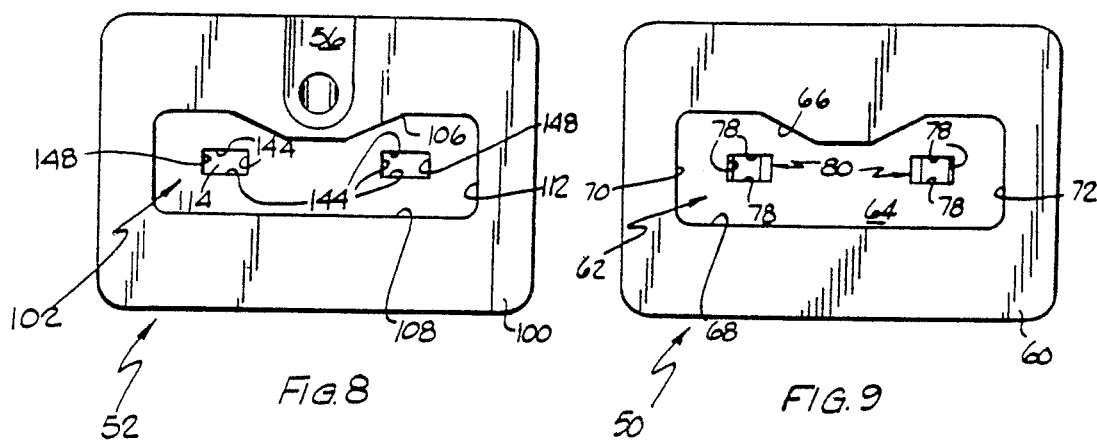
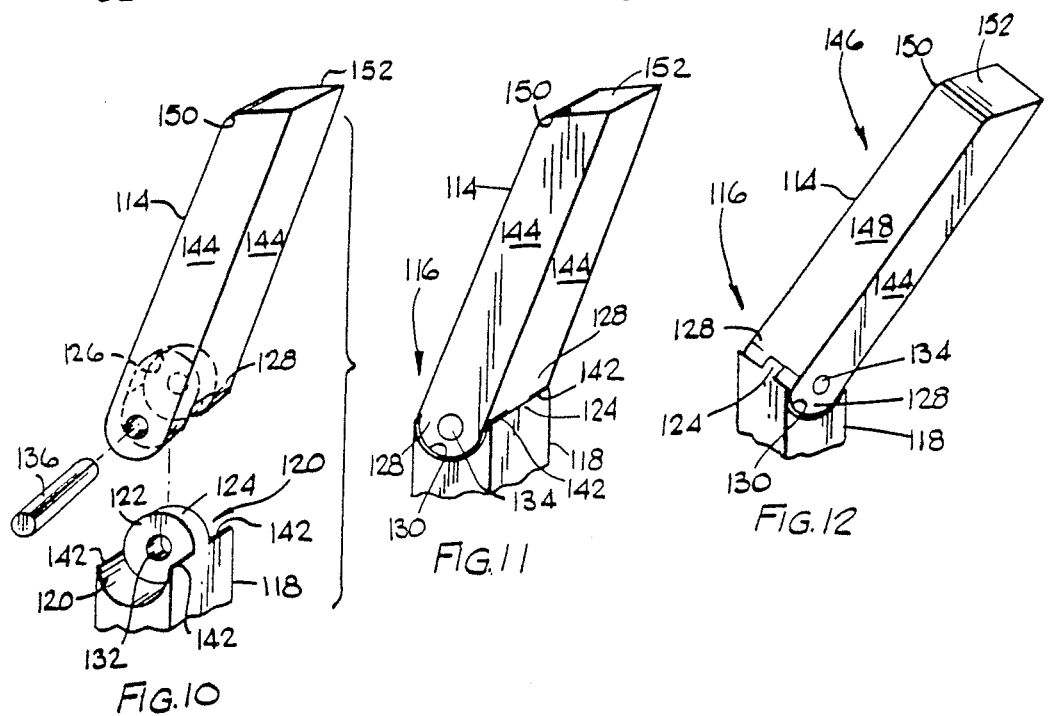
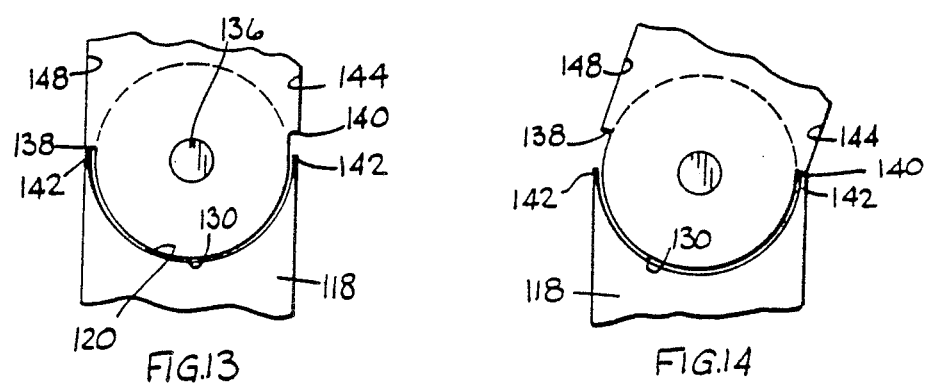

APPARATUS AND METHOD FOR MOLDING THREE DIMENSIONAL ARTICLES

This application is a continuation-in-part of U.S. patent application Ser. No. 348,515 now U.S. Pat. No. 4,956,142 filed May 8, 1989.

FIELD OF THE INVENTION

This invention relates generally to the molding of three dimensional articles and more particularly to the molding of such articles having at least one passageway formed therein with an internal recess or indentation formed in such passageway and molded locking members.

BACKGROUND OF THE INVENTION

One type of lock used to control access to a container or other similar article is a plastic lock comprising a body portion and a link portion comprising an arcuately shaped portion having two integral parallel legs. The body portion has two passageways extending therethrough with an indentation in each passageway. The legs of the link portion are shaped to be able to be pushed through the passageways and are provided with a resilient projection. As the legs are pushed through the passageways, the resilient projections are compressed until they reach the indentations in the passageways and move into such indentations so as to be locked in position. The indentations and projections are designed to prevent movement only in one direction which is to prevent pulling of the legs out of the passageways after they have been locked. The arcuately shaped portion limits further inward movement of the legs after the projections have reached the indentations. When it is desired to gain access to the container, the portions of the legs between the arcuately shaped portion and the body portion are cut. The remaining portions of the legs are then pushed through the passageways and are then discarded with the arcuately shaped portion. The body portion is kept to be used with a new link portion to control access to another situation. The cost of the body portion is significantly greater than the cost of the link portion. This is primarily due to the manufacturing cost to form the indentations in the passageways. In one method of forming the body portion, two parts of a mold are moved in linear directions between an opened or a closed position and when in a closed position, they form a cavity. At least one of these mold parts contains a pair of fixed arms utilized to form the passageways. In addition, one of the mold parts contains a pair of rods having a controllable movement perpendicular to the fixed arms and locatable adjacent thereto so as to form the indentations in each passageway. The movable rods are moved through one part of the closed mold into the appropriate position in the cavity while the mold is in the closed position. After the plastic material has been injected into the closed mold and cured, the movable rods are first withdrawn and then the two part mold is moved to the opened position and the formed body portion is removed. This method forms the necessary indentations in the passageway but also forms two openings in the body portion which then have to be sealed over. Thus, there existed a need for a new more economical system for forming such body portions.

BRIEF DESCRIPTION OF THE INVENTION

This invention provides apparatus and method for forming an injection molded three dimensional article having at least one passageway formed therein with an indentation formed in such passageway wherein the article leaving the mold is ready for use without any significant additional operations to be performed thereon.

In a preferred embodiment of the invention, the three dimensional article is described in relation to the injection molding of plastic material to form the body portion of the above-described plastic lock, but it is understood that the three dimensional plastic article can be for any purpose or shape and be formed from any injection moldable material. Also, the three dimensional plastic article can have one or more passageways formed therein. The apparatus and method for the system described herein utilizes a two part mold. A first mold part comprises a body member having an open ended cavity formed therein and defined by an end wall and a plurality of sidewalls. A pair of fixed arms on the end wall project outwardly from the open ended cavity. The fixed arms are spaced from each other and from each of the plurality of sidewalls and are in a generally parallel relationship. At least one contoured surface is formed on each of the pair of arms and these contoured surfaces are in a facing relationship. A second mold part comprises a body member having an open ended cavity formed therein and defined by an end wall and a plurality of sidewalls. A pair of movable arms are pivotally mounted in mounting means on the end wall for limited free rotational movement each about its own fixed axis through a predetermined arc. The movable arms are spaced from each other and from each of the plurality of sidewalls. At least one contoured surface is formed on each of the movable arms and they are located so that facing portions of the contoured surfaces of the fixed and movable arms are in continuous contacting relationship while the three dimensional plastic article is being formed. Moving means are provided for moving the first and second mold parts to an opened or closed position. Also, a conventional gate is formed in one of the mold parts through which the plastic material is injected in a conventional manner and a conventional ejecting system is employed to remove the three dimensional article from the second mold part.

In operation, the movable arms may be at any location between their limited arc of rotational movement. The free end of the contoured surface of each fixed arm is tapered with the smallest portion thereof closest to the free end of the contoured surface of each of the movable arms. If a movable arm is at one end of its arc of rotation, the free end thereof will be contacted by the tapered surface of the fixed arm and be rotated thereby as the first and second mold parts are being moved to a closed position. Each fixed arm has a length such that, when the first and second mold parts are in a closed position, the extremity of each fixed arm is substantially in contact with a portion of the mounting means for the movable arms. Also, the gate opening through which the plastic material is injected is located between the two movable arms. Therefore, in the closed position, even, if both movable arms are at the other end of its arc of rotation, or in any way in less than complete contact with the fixed arm portions, as the plastic material is injected into the closed mold, it contacts the two movable arms and rotates them until the facing portions of the contoured surfaces of each movable arm and each fixed arm are in a continuous contacting relationship. In this relationship, a combined fixed and movable arm has three substantially planar surfaces and one non-planar surface to provide a protruding portion with the non-planar surfaces in a facing relationship. The fixed and movable arms combine to form a pair of spaced apart members each extending between the end walls of the first and second mold parts and each having a relatively large internal transverse cross-sectional configuration that is greater than the smallest internal transverse cross-sectional configuration between the relatively large internal transverse cross-sectional configuration and either of the end walls of the first and second mold parts so as to form the internal indentation. Also, the pivotal mounting means, the fixed arms and the movable arms, while in the above-described relationship, provide no openings into which the plastic material can flow. After the plastic material has been cured, the first and second mold parts are moved to an opened position. While the first and second mold parts are moving to the opened position, the fixed arm withdraws with the first mold part to which it is attached and the movable arm rotates as necessary to facilitate its removal from the interior of the plastic article while the three dimensional plastic article having a pair of spaced apart passageways each having at least one uni-directional locking indentation formed therein is ejected therefrom. The invention also includes links for use with body portions to form locking means.

BRIEF DESCRIPTION OF THE DRAWINGS

An illustrative and presently preferred embodiment of the invention is shown in the accompanying drawings in which:

FIG. 1 is an exploded perspective view of a plastic lock;

FIG. 2 is a perspective view with parts in section of FIG. 1 in an assembled relationship;

FIG. 3 is a cross-sectional view of the body portion of FIG. 2;

FIG. 4 is a perspective view of a mold in an open position;

FIG. 5 is a perspective view of FIG. 4 in a closed position;

FIG. 6 is a cross-sectional view of a mold of this invention in an opened position;

FIG. 7 is a cross-sectional view of the mold of this invention in a closed position;

FIG. 8 is a front elevational view of the lower portion of FIG. 6;

FIG. 9 is a front elevational view of the upper portion of FIG. 6;

FIG. 10 is an exploded perspective view of the movable arm of this invention and its mounting means;

FIG. 11 is a perspective view from the right side of FIG. 10;

FIG. 12 is a perspective view from the left side of FIG. 10;

FIG. 13 is an enlarged plan view of a movable arm at one end of its arc of rotation;

FIG. 14 is an enlarged plan view of a movable arm at the other end of its arc of rotation;

DETAILED DESCRIPTION OF THE INVENTION

Figure 15:
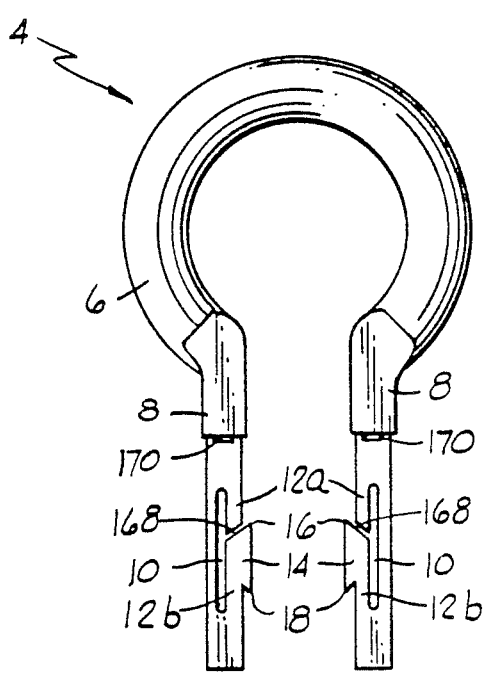
FIG. 15 is a plan view of another embodiment of a link portion.

In FIGS. 1-3, there is illustrated a plastic lock 2 of the type described above and a body portion formed in accordance with this invention. While the invention is described in relation to the plastic lock, it is understood that a three dimensional plastic article having at least passageway and one indentation may be formed in accordance with this invention and be for any use and of any shape. Also, as stated above, the three dimensional article can be formed using any desirable injection moldable material. The plastic lock 2 has a link portion 4 comprising an arcuately extending portion 6 and two integral legs 8 each having a generally square cross-sectional configuration. Each leg 8 has a longitudinally extending slot 10 formed therein with the wall 12 of each leg 8 adjacent to the slot 10 being relatively thin so as to permit flexing thereof. A locking member 14 projects outwardly from each wall 12 and has a pair of spaced apart hook portions 16 and 18 for purposes described below. The body portion 20 for the plastic lock 2 comprises a three dimensional housing 22 having a pair of spaced apart passageways 24. Each passageway 24 has three sidewalls 26 having generally planar surfaces and one sidewall 28 having a non-planar surface. Each sidewall 28 has an inclined surface 30 at the entrance to each passageway 24 so that the greatest distance between it and the sidewall 26 opposite thereto is greater than the total thickness of each leg 8 and projection 14 so that, as the legs 8 are inserted through each passageway 24, the wall 12 will be gradually flexed to permit movement of the leg 8 and projection 14 through the passageway 24. The surface of the passageway after the inclined surface 30 is substantially planar and parallel to the sidewall 26 opposite thereto until the indentations 32 are reached. When the hook portion 16 passes the beginning of the indentation 32, it is flexed outwardly so that the hook portion 16 and the indentation 32 form an uni-directional locking means for preventing movement of the legs 8 in a direction indicated by the arrow 34. The hook portion 16 and the indentation 32 permit a slight movement of the legs 8 in the direction of the arrow 34 so that a slight portion 36 of the legs 8 may be exposed above the housing 22. The arcuately extending portion 6 prevents movement of the legs 8 in a direction opposite to the arrow 34. The surface 38 of the sidewall 28 tapers outwardly toward the sidewall 26 opposite thereto until the exit portion of the passageway 24. When it is desired to unlock the access control lock 2, the arcuately extending portion 6 is pulled in the direction of the arrow 34 and a suitable tool is used to sever each leg 8 at the slight portion 36. Each leg 8 is then pushed in a direction opposite to the arrow 34 and removed from the body portion 20. The arcuately extending portion 6 and the severed legs 8 are discarded, but the body portion 20 is saved for later use. The hook portions 18 cooperate with the lips 40 to prevent the insertion of the legs 8 into each passageway 24 in the wrong direction.

The apparatus and method for forming the body portion 20 of the plastic lock 2 is described in relation to FIGS. 4-12. The molding means comprises a first mold part 50 and a second mold part 52 which are illustrated in the opened position in FIG. 4 and in the closed position in FIG. 5. Suitable means, such as a reciprocal ram 54, are used to move the first mold part 50 toward or away from the fixed second mold part 52. Only one first mold part 50 and second mold part 52 are illustrated, but it is understood that in actual operation, there are a multiplicity of first molds 50 and second molds 52 that may be moved between opened and closed positions by any conventional means. A conventional gate 56 is formed in the second mold part 52 to be connected to conventional apparatus so that plastic material may be injected therethrough into the closed first and second molds.

The first mold part 50 is illustrated in the opened position in FIGS. 6 and 9 and comprises a body member 60 having an open ended cavity 62 formed therein and defined by an end wall 64 and a plurality of sidewalls comprising a top wall 66, a bottom wall 68 and two opposite sidewalls 70 and 72. A pair of fixed arms 74 extend outwardly from the end wall 64 and have free end portions 76 which project outwardly from the open ended cavity 62. Each fixed arm 74 has three generally planar surfaces 78 and one non-planar surface 80. The non-planar surfaces 80 have an inclined generally planar surfaces 82 which form the inclined portions 30 of FIG. 3, generally planar surfaces 84 which are parallel to the sidewalls 70 and 72 and contoured surfaces 86 having portions 88 which are inclined at a relative small angle to the planar surfaces 78 which are parallel to the sidewalls 70 and 72 and portions 90 that are inclined at a relatively large angle to the planar surfaces 78 which are parallel to the sidewalls 70 and 72. The purpose of the contoured surfaces 86 is described below. As illustrated, the fixed arms 74 are spaced from each other and from the top wall 66, the bottom wall 68 and the sidewalls 70 and 72. The end edge 92 of each fixed arm 74 is a feathered edge.

The second mold part 52 is illustrated in the opened position in FIGS. 6 and 8 and comprises a body member 100 having an open ended cavity 102 formed therein and defined by an end wall 104, a top wall 106, a bottom wall 108 and two opposite sidewalls 110 and 112. A pair of movable arms 114 are mounted for limited rotational movement on pivotal mounting means 116 on the end wall 104. The mounting means 116 are illustrated specifically in FIGS. 10-14 and comprise a support member 118 fixedly mounted in a recess in the body member 100. The support member 118 has two spaced apart arcuate surfaces 120 having an arcuate extent of about 180 degrees with the surface of the end wall 104 being tangent thereto at the 90 degree location. The support member 118 is part of a hinge with one knuckle 122 thereof being integral with the support member 118 and having an arcuate outer peripheral surface 124 having a diameter slightly greater than the diameter of the arcuate surfaces 120. Each movable arm 114 has a centrally located arcuate surface 126 and two spaced apart knuckles 128 having an arcuate outer peripheral surface 130 having a diameter substantially the same as the diameter of the arcuate surface 126. The knuckle 122 has a central opening 132 and the two knuckles 128 have central openings 134 extending therethrough so that a pivot pin 136 may be inserted through the openings 132 and 134 to form a hinge connection between the movable arm 114 and the support member 118. The outer peripheral surfaces 130 are formed from a block of material having a thickness slightly greater than the diameters of the outer peripheral surfaces 130 so as to form abutment shoulders 138 and 140 thereon which cooperate with the abutment edges 142 at the extremities of the arcuate surface 120 formed by the differences in the diameters of the arcuate surfaces 120 and the arcuate outer peripheral surface 124 of the knuckle 122 to limit the rotational movement of the movable arms 114 for purposes described below. However, it is understood that each movable arm 114 rotates freely in the arc of rotation defined by the abutment shoulders 138 and 140 and the abutment edges 142. Each movable arm 114 has three generally planar surfaces 144 and one contoured surface 146 having a generally planar portion 148, an arcuate portion 150 and another relatively short planar portion 152 which is tangent to the end of the arcuate portion 150. The rotational limits of the movable arms 114 are illustrated in FIG. 6 wherein the abutment shoulders 138 of the movable arm 114 on the left and the abutment edges 142 are in contacting relationship and the abutment shoulders 140 of the movable arm 114 on the right and the abutment edges 142 are in contacting relationship. The purpose of the limited movement of the movable arm 114 on the left is so that the portion 88 of the contoured surface 86 adjacent to the end edge 92 will contact the movable arm 114 and rotate it for purposes described below. The purpose of the limited movement on the movable arm 114 on the left is so that the gate opening 56 is located between the movable arms for purposes described below.

The relative location of the fixed arms 74 and the movable arms 114 during the actual molding of the three dimensional plastic article 2 is illustrated in FIG. 7. As the first and second molds 50 and 52 are moved from the opened position of FIG. 6 to the closed position of FIG. 7, the portion 88 of the contoured surface 86 of the fixed arm 74 on the left will contact and rotate the movable arm 114 on the left. The movable arm may rotate only as far as illustrated on the left of FIG. 7 or it may continue to rotate through an arc of the same extent as that illustrated on the right of FIG. 6 so that that the abutment shoulders 140 thereof are in contacting relationship with the abutment edges 142. When the first and second molds 50 and 52 are in the closed position of FIG. 7, the three generally planar surfaces 78 of the fixed arms 74 and the respective three generally planar surfaces 144 of the movable arms 114 are co-planar. As the plastic material is injected through the gate opening 56 in the top wall 106, it contacts the planar surfaces 144 of the movable arms 114 opposite to the contoured surfaces 146 and rotates them until the contoured surfaces 146 are in a continuous contacting relationship with the contoured surfaces 86. In this relationship, each of the facing surfaces of the pair of movable arms 114 are non-planar and have a first portion extending from the end wall 64 in a linear direction parallel to a plane passing through and containing the aligned longitudinal axes 153 of the first and second mold parts 50 and 52 and such plane being parallel to the opposite sidewalls of the cavity formed by the first and second mold parts 50 and 52; a second portion extending from the first portion in a linear direction and parallel to the plane and parallel to the opposite sidewalls; a third portion extending from the second portion and projecting inwardly toward the plane to form an angular relationship with the second portion of preferably not more than 90 degrees and a fourth portion extending from the third portion in a linear direction and having an acute angular relationship with the plane and terminating at the end wall 104. While the angular relationship between the second and third portions can be slightly greater than 90 degrees, it cannot be so great so as to provide an inclined surface which would permit the gradual compression of the locking member 14. Since the forces in the closed mold part during the molding process are in equilibrium, there is no tendency to separate the movable arms 114 from the fixed arms 74.

The fixed arms 74 and the movable arms 114 can be of any transverse cross-sectional configuration, such as round, square, rectangular, and have a shape that permits them to be pulled out to form the passageways 24 after the three dimensional article has been cured. When the contoured surfaces of the fixed 74 and movable arms 114 are in the continuous contacting relationship, they form a member extending between the end walls 64 and 104 which member has a relatively large internal transverse cross-sectional configuration 160 that is greater than the smallest internal configurations 162 and 164 between the relatively large internal transverse cross-sectional configuration and the end wall 64 or 104. The fixed arms 74 have an outer peripheral surface permitting them to be withdrawn from the three dimensional plastic article after the injected plastic material has been cured. The movable arms 114 have an outer peripheral surface which cooperates with the rotational movement of the rotatable arms in permitting the movable arms to be withdrawn through the relatively small internal cross-sectional configurations 164 after the injected plastic material has been cured to form the three dimensional plastic article. In the embodiment illustrated in FIG. 7, as the first and second mold parts 60 and 100 are moved from the closed position to the opened position, the fixed arms 74 are withdrawn from the cured three dimensional plastic article 20. After that, a conventional ejector system (not shown) applies a force on the three dimensional article 20 so that the movable arms rotate as they are withdrawn through the relatively small internal cross-sectional configurations 164 of the three dimensional plastic article. The white portions of FIG. 7 correspond to the cross-hatched portions of FIG. 3 and the cross-hatched portions of the fixed and movable arms 74 and 114 correspond to the white portions of FIG. 3. The end wall 104 has a central raised portion 166 to cooperate with the movable arm 114 to form the lips 40. As the first and second molds 50 and 52 are moved from closed position to the opened position, conventional means (not shown) are used to remove the three dimensional article 2 from the fixed arms 74 and the movable arms 114. As illustrated in FIGS. 3 and 7, there is nothing to prevent the fixed arms 74 from moving through the entrances of the passageways 24 and the movable arms 114 from moving through the exits of the passageways 24. While the general cross-sectional configuration of the legs 8 and passageways 24 are illustrated as being rectangular, it is understood that they can be of any cross-sectional configuration as long as the legs 8 have some type of a resilient projection and the passageways have some type of an internal indentation. The links 4 are made from an acetal resin or other materials having similar characteristics. The body portions 20 are made from a glass reinforced nylon or other materials having similar characteristics.

The link portion illustrated in FIG. 15 is similar to the link portion 4 in FIG. 1 and corresponding reference numerals have been applied thereto. The link portion in FIG. 15 differs from that in FIG. 1 in that the wall 12 comprises a first section 12a and a second section 12b. As illustrated in FIG. 15, a space 168 exists between the first sections 12a and the second sections 12b. This structure ensures that the hook portion 16 will engage the indentation 32 if a force is applied to portion 6 to try to remove the legs 8 out of the body portion 20. When the locking member 14 contacts the inclined surface 30 as the legs 8 are being inserted into the passageways 24, the hook portions 16 move into contact with the first sections 12a. Therefore, when the indentations 32 have been passed, the first sections 12a will push against the hook portion 16 to ensure that the hook portions 16 return to the proper location to contact the indentations 32 when moved in the opposite direction. Also, an opening 170 is formed in each leg 8 so that it can be readily severed when it is desired to remove the lock.

Figure 16:
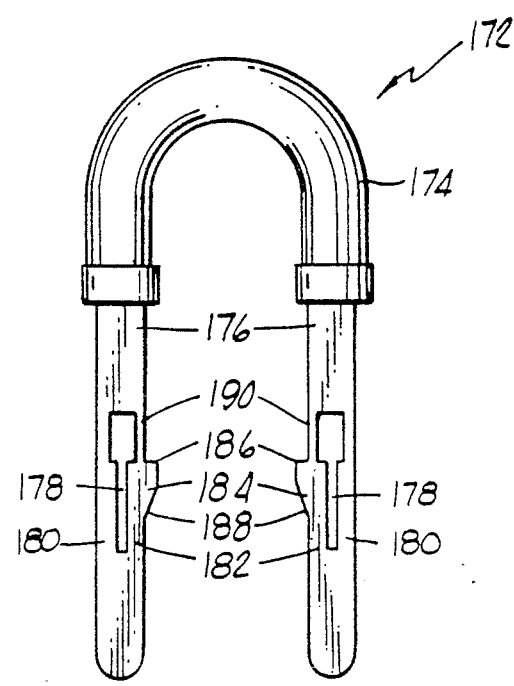
FIG. 16 is a plan view of a further embodiment of a link portion.

In FIG. 16, there is illustrated another link portion 172 that is adaptable for use with a body portion (not shown) of the prior art in which the passageway, therein has similar entrance/exit portions so that the link portion may be inserted into either end of the body portion. The link portion 172 comprises an arcuately extending head portion 174 and two integral leg portions 176 each having a generally square cross-sectional configuration. Each leg portion 176 has a longitudinally extending slot 178 formed therein with the walls 180 and 182 of each leg portion 176 opposite to slot 178 being relatively thin to permit flexing thereof. A locking member 184 projects outwardly from each wall 182 and has a hook portion 186 for contacting and internal indentation in the passageway of the body portion. The locking member 184 has an inclined surface 188 that contacts the passageway to apply a force on the locking member 184 so that it will move inwardly so that it can be inserted into the passageway. As illustrated in FIG. 16, the sections 190 of the walls 182 are thinner than any other sections of the walls 180 and 182. Therefore, if a force is applied to the head portion 174 trying to remove the link portion 172 from the body portion, the thin sections 190 will be the first to break ensuring that the hook portion 186 will remain in contact with the internal indentation.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A uni-directional lock comprising:
   a body portion having at least one passageway extending therethrough;
   said passageway having an entrance portion and an exit portion;
   said passageway having at least one internal indentation formed therein and located between said entrance portion and said exit portion;
   a link portion having a head portion and at least one integral leg portion;
   said head portion having a cross-sectional configuration greater than the cross-sectional configuration of said passageway so that is cannot be moved into said passageway and contacts said body portion when said at least one integral leg portion has been inserted into said passageway;
   said at least one integral leg portion having a longitudinal axis and an outer surface;
   said at least one integral leg portion having a longitudinally extending slot formed therein so that at least a portion of said at least one integral leg portion opposite to said slot is relatively thin and flexible;

a hook portion extending outwardly from said outer surface of said at least a portion of said at least one integral leg portion so that said hook portion moves inwardly when a force is applied thereto and resiles back when said force is removed, said entrance portion and said hook portion being dimensioned so that said at least one integral leg portion can be inserted into said entrance portion and moved in one direction into said body portion until said hook portion moves into said internal indentation to prevent withdrawal of said at least one integral leg portion from said body portion;

said exit portion and said hook portion being dimensioned so that, when said head portion is separated from said at least one integral leg portion, said at least one integral leg portion can be pushed through said exit portion; and said exit portion and said hook portion being dimensioned so that said hook portion cannot be moved through said exit portion into said body portion.

2. The invention as in claim 1 wherein:

said passageway has a rectangularly shaped cross-sectional configuration; and said leg portion has a rectangularly shaped cross-sectional configuration.

3. The invention as in claim 2 wherein:

said entrance portion having a cross-sectional configuration larger than the cross-sectional configuration of said leg portion at said hook portion; and an inclined surface in said passageway extending from said entrance portion into said body portion and adapted to be contacted by said hook portion to apply forces thereto to move said hook portion inwardly as it is pushed into said body portion.

4. The invention as in claim 3 wherein:

said hook portion extends in said longitudinal direction; and said hook portion has opposite acute angled surfaces facing in opposite longitudinal directions.

5. A uni-directional lock comprising:

a body portion having at least one passageway extending therethrough;

said passageway having an entrance portion and an exit portion;

said passageway having at least one internal indentation formed therein and located between said entrance portion and said exit portion;

a link portion having a head portion and at least one integral leg portion;

said head portion having a cross-sectional configuration greater than the cross-sectional configuration of said passageway so that it cannot be moved into said passageway and contacts said body portion when said at least one integral leg portion has been inserted into said passageway;

said at least one integral leg portion having a longitudinal axis and an outer surface;

said at least one integral leg portion having a longitudinally extending slot formed therein so that at least a portion of said at least one integral leg portion opposite to said slot is relatively thin and flexible;

a hook portion extending outwardly from said outer surface of said at least a portion of said at least one integral leg portion so that said hook portion moves inwardly when a force is applied thereto and resiles back when said force is removed;

said entrance portion and said hook portion being dimensioned so that said at least one integral leg portion can be inserted into said entrance portion and moved in one direction into said body portion until said hook portion moves into said internal indentation to prevent withdrawal of said at least one integral leg portion from said body portion;

said at least a portion of said at least one integral leg portion having at least first and second separate sections;

said first section being located closer to said head portion; and said second section having said hook portion being spaced from said first section.

6. The invention as in claim 5 and further comprising:

at least two passageways formed in said body portion; and said head portion having at least two integral spaced apart leg portions.

7. A uni-directional lock comprising:

a body portion having at least one passageway extending therethrough;

said passageway having at least one internal indentation formed therein;

a link portion having a head portion and at least one integral leg portion;

said head portion having a cross-sectional configuration larger than the cross-sectional configuration of said passageway so that said head portion cannot be inserted into said passageway;

said at least one integral leg portion having a longitudinal axis and a generally uniform outer surface and having a cross-sectional configuration smaller than said cross-sectional configuration of said passageway so that said at least one integral leg portion may be inserted into said passageway;

said at least one integral leg portion having a longitudinally extending slot formed therein so that at least a portion of said at least one integral leg portion opposite to said slot is relatively thin and flexible;

a hook portion extending outwardly from said outer surface of said at least a portion of said at least one integral leg portion so that said hook portion moves inwardly when a force is applied thereto and resiles back when said force is removed;

said entrance portion and said hook portion being dimensioned so that said at least one integral leg portion can be inserted into said entrance portion and moved in one direction into said body portion until said hook portion moves into said internal indentation to prevent withdrawal of said at least one leg portion from said body portion; and a section of said at least a portion of said at least one integral leg portion located between said hook portion and said head portion being frangible so that said section will break when subjected to excessive force to form two sections to ensure that said hook portion will remain in said internal indentation to prevent withdrawal of said at least one leg portion.

8. The invention as in claim 7 and further comprising:

said body portion having at least two passageways formed therein; and said head portion having at least two integral leg portions.

* * * * *